Sept. 28, 1965     H. O. SCHOLL     3,208,331
RIVET DEVICE
Filed Aug. 31, 1962
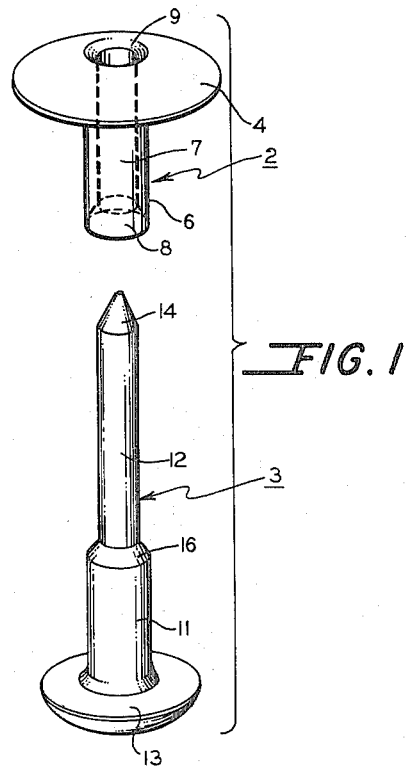
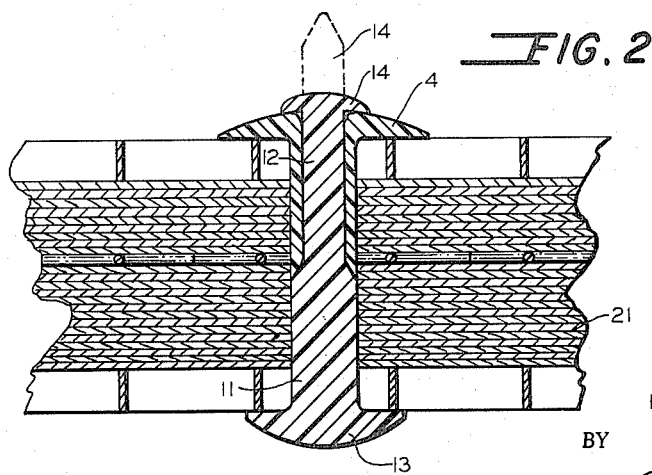
INVENTOR.
HOWARD O. SCHOLL
BY
*Ralph S. Brick*
ATTORNEY

United States Patent Office 3,208,331
Patented Sept. 28, 1965

3,208,331
RIVET DEVICE
Howard O. Scholl, Louisville, Ky., assignor to American Air Filter Company, Inc., Louisville, Ky., a corporation of Delaware
Filed Aug. 31, 1962, Ser. No. 220,751
3 Claims. (Cl. 85—37)

The present invention relates to fastening devices for structural elements and more particularly to a rivet device for connecting together a plurality of laminar sheets of material.

In accordance with the present invention, a straightforward and economical rivet construction is provided which permits the efficient connecting together of various arrangements of laminated sheets without crushing or otherwise harming such sheets during the assembly operations. Further, the present invention provides a novel arrangement for insuring that the rivet assembly is firmly fastened over long periods of time without necessitating complex parts or requiring time and labor consuming operations.

Various other features of the present invention will become obvious to one skilled in the art upon reading the disclosure set forth hereinafter.

More particularly, the present invention provides a rivet comprising a tubular female member including integral head and body portions having an axial passage extending longitudinally therethrough; and, a male member including integral shank and stem partions, the stem portion of the male member having a cross-sectional dimension throughout less than the cross-sectional dimension of the axial passage in the female member and a length greater than the length of such axial passage whereby the stem portion can be passed through the axial passage with the tip thereof extending beyond the head portion of the female member, the shank portion of the male member having a cross-sectional dimension greater than the cross-sectional dimension of such axial passage to restrain the extent of passage of the stem portion therethrough, the tip of the stem portion being of fusible material which can be melted to hold the male and female members in fast assembled position.

It is to be understood that various changes can be made in the arrangement, form and construction of the apparatus disclosed herein without departing from the scope or spirit of the present invention.

Referring to the drawing which discloses one advantageous embodiment of the present invention:

FIGURE 1 is an exploded perspective view of the inventive rivet device; and

FIGURE 2 is a vertical cross-sectional view of the rivet device of FIGURE 1, disclosing the device in assembled position to connect together a number of laminar sheets of filter medium of a filter apparatus.

As can be seen in FIGURE 1 of the drawing, the inventive rivet is broadly comprised of two parts; namely, a tubular female member 2 and a nesting male member 3. Female member 2 includes an integral head portion 4 and body portion 6, the head and body portion having passage 7 extending therethrough along the longitudinal axis of the rivet member. Passage 7 is arranged to terminate at one end of body portion 6 in tapered recess 8 and to terminate in head portion 4 in tapered recess 9. Male member 3 includes an integral shank portion 11, stem portion 12 and head portion 13. It is to be noted that stem portion 12 of male member 3 is of crosssectional dimension throughout slightly less than the crosssectional dimension of passage 7 and is of a greater length than passage 7 to permit its insertion therethrough with tip 14 extending beyond head portion 4 (FIGURE 2). It also is to be noted that shank 11 of male member 3 is of cross-sectional dimension greater than the cross-sectional dimension of passage 7 so as to restrain the extent of passage of stem 12 through passage 7, shank 11 being provided with a suitably tapered shoulder 16 adjacent stem 12 which engages in tapered recess 8 of the female member 2 in nesting fashion.

Advantageously, both parts of the inventive rivet member can be made from any one of a number of suitable acid resistant, thermoplastic materials which are capable of softening at temperatures of approximately 160° F. to approximately 180° F. to permit changes in shape and which are capable of hardening in such changed shape at temperatures of approximately 120° F. without injury to the chemical properties of the material. For example, a polyvinyl chloride or a polyethylene plastic can be used, such materials further including a controlled amount of plasticizer so as to be sufficiently rigid for assembly operations.

As can be seen in FIGURE 2 of the drawing, the inventive rivet arrangement of FIGURE 1 is shown in assembled position, connecting together a plurality of laminated sheets of material broadly designated by reference numeral 21, such sheets of material being filter media such as that disclosed in assignee's Patent No. 3,022,859. It will be noted that tip 14 of stem 12 projects beyond head portion 4 so that tapered shoulder 16 of shank 11 nests in the tapered recess 8 of female member 2, this tapered arrangement of shoulder and recess not only serving to determine the extension of stem 12 through the passage 7 but also serving as a guiding device to insure proper alignment of the parts in assembly operation. With tip 14 of stem 12 extending beyond head portion 4 of female member 2, as is shown by the dotted lines in FIGURE 2, the rivet is held in place with a suitable bucking instrument (not shown). A heating member (not shown) is then applied to tip 14 to melt the same, the melted portion of the tip flowing into recess 9 of head portion 4 and over the top of the head portion to insure a firm fastening of numbers 2 and 3.

What I claim is:

1. A rivet comprising: a tubular female member including integral head and body portions having an axial passage extending longitudinally therethrough, said body portion of said female member having a cross-sectional dimension less than the cross-sectional dimension of said head portion of said female member; and a male member including integral head, shank and stem portions, said shank portion of said male member having a cross-sectional dimension less than the cross-sectional dimension of said head portion of said male member and greater than the cross-sectional dimension of said axial passage of said female member, said shank portion of said male member including a tapered shoulder adjacent said stem portion of said male member and said axial passageway of said female member having a tapered recess to receive said tapered shoulder in nesting relationship therewith, said stem portion of said male member having a cross-sectional dimension throughout less than said shank portion of said male member and less than the cross-sectional dimension of said axial passage in said female member and a length greater than the length of said axial passage in said female member whereby said stem portion can extend through said axial passage with the tip thereof extending beyond said head portion of said female member, said tip being of solid fusible thermoplastic material which can be heat softened and distorted to hold said male and female members in fast position.

2. The apparatus of claim 1, said tip being of thermoplastic material which can be softened at temperatures between 160° F., to approximately 180° F., and hardened at a temperature of approximately 120° F.

3. The apparatus of claim 1, said head portion of said female member having a recess adjacent said axial passageway to receive part of the melted tip of the stem portion of said male member.

References Cited by the Examiner

UNITED STATES PATENTS

| | | | |
|---|---|---|---|
| 2,458,152 | 1/49 | Eakins | 85—37 |
| 2,574,435 | 11/51 | Maxim et al. | 85—37 |
| 2,942,748 | 6/60 | Anderson | 85—38 |
| 2,957,196 | 10/60 | Kreider et al. | 85—40 |
| 3,142,088 | 7/64 | Cravath | 85—37 |

FOREIGN PATENTS

| | | |
|---|---|---|
| 961,209 | 11/49 | France. |
| 1,141,298 | 3/57 | France. |

EDWARD C. ALLEN, *Primary Examiner.*